United States Patent
Greenfield et al.

(10) Patent No.: US 12,430,765 B2
(45) Date of Patent: *Sep. 30, 2025

(54) METHOD AND SYSTEM FOR IMAGING A CELL SAMPLE

(71) Applicant: S.D. Sight Diagnostics Ltd., Tel Aviv (IL)

(72) Inventors: Yuval Greenfield, Sunnyvale, CA (US); Yonatan Bilu, Jerusalem (IL); Joseph Joel Pollak, Neve Daniel (IL); Noam Yorav-Raphael, Tekoa (IL)

(73) Assignee: S.D. DIAGNOSTICS LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,680

(22) Filed: Oct. 4, 2023

(65) Prior Publication Data
US 2024/0029250 A1 Jan. 25, 2024

Related U.S. Application Data

(63) Continuation of application No. 17/576,023, filed on Jan. 14, 2022, now Pat. No. 11,803,964, which is a
(Continued)

(51) Int. Cl.
*G06T 7/00* (2017.01)
*G02B 7/38* (2021.01)
(Continued)

(52) U.S. Cl.
CPC ............. *G06T 7/0012* (2013.01); *G02B 7/38* (2013.01); *G02B 21/16* (2013.01); *G02B 21/244* (2013.01);
(Continued)

(58) Field of Classification Search
None
See application file for complete search history.

(56) References Cited

U.S. PATENT DOCUMENTS

| 3,603,156 A | 9/1971 | Konkol |
| 3,676,076 A | 7/1972 | Grady |

(Continued)

FOREIGN PATENT DOCUMENTS

| CA | 2655024 C | 11/2014 |
| CN | 101403650 | 6/2010 |

(Continued)

OTHER PUBLICATIONS

"Blood specimens: Microscopic Examination", Centers for Disease Control and Prevention CDC, Diagnostic Procedures, 2009, <http://www.dpd.cdc.gov/dpdx/HTML/Frames/DiagnosticProcedures/body_dp_bloodexamin.htm>.

(Continued)

*Primary Examiner* — Dave Czekaj
*Assistant Examiner* — Shanika M Brumfield
(74) *Attorney, Agent, or Firm* — Sughrue Mion, PLLC

(57) ABSTRACT

Apparatus and methods are described for use with a cell sample that includes a plurality of cells. A series of images associated with a series of depth levels of the cell sample are acquired, by performing a depth scan of cell sample with a microscope. One of the depth levels is identified as being an optimum focal plane for imaging one or more entities within the cell sample using the microscope, under a first illumination condition. The cell sample is imaged under a second illumination condition that is different from the first illumination condition, using the microscope, by focusing the microscope at an investigative depth level that is based on the identified depth level. Other applications are also described.

14 Claims, 5 Drawing Sheets

Related U.S. Application Data continuation of application No. 16/706,159, filed on Dec. 6, 2019, now Pat. No. 11,295,440, which is a continuation of application No. 16/232,124, filed on Dec. 26, 2018, now Pat. No. 11,100,634, which is a continuation of application No. 14/285,672, filed on May 23, 2014, now Pat. No. 10,176,565.

(60) Provisional application No. 61/826,718, filed on May 23, 2013.

(51) Int. Cl.
 G02B 21/16 (2006.01)
 G02B 21/24 (2006.01)
 G02B 21/36 (2006.01)
 G06T 7/507 (2017.01)

(52) U.S. Cl.
 CPC ......... G02B 21/361 (2013.01); G02B 21/367 (2013.01); G06T 7/507 (2017.01); G06T 2207/10056 (2013.01); G06T 2207/30024 (2013.01)

(56) References Cited

U.S. PATENT DOCUMENTS

| | | |
|---|---|---|
| 3,786,184 A | 1/1974 | Pieters |
| 3,967,056 A | 6/1976 | Yata et al. |
| 4,076,419 A | 2/1978 | Kleker |
| 4,209,548 A | 6/1980 | Bacus |
| 4,350,884 A | 9/1982 | Dieter |
| 4,454,235 A | 6/1984 | Johnson |
| 4,494,479 A | 1/1985 | Drury et al. |
| 4,580,895 A | 4/1986 | Patel |
| 4,700,298 A | 10/1987 | Palcic et al. |
| 4,761,381 A | 8/1988 | Blatt et al. |
| 4,774,192 A | 9/1988 | Terminiello et al. |
| 4,803,352 A | 2/1989 | Bierleutgeb |
| 4,849,340 A | 7/1989 | Oberhardt |
| 4,902,101 A | 2/1990 | Fujihara et al. |
| 5,001,067 A | 3/1991 | Coleman et al. |
| 5,064,282 A | 11/1991 | Curtis |
| 5,229,265 A | 7/1993 | Tometsko |
| 5,300,779 A | 4/1994 | Hillman et al. |
| 5,331,958 A | 7/1994 | Oppenheimer |
| 5,430,542 A | 7/1995 | Shepherd et al. |
| 5,499,097 A | 3/1996 | Ortyn et al. |
| 5,672,861 A | 9/1997 | Fairley et al. |
| 5,674,457 A | 10/1997 | Williamsson et al. |
| 5,745,804 A | 4/1998 | Iwane |
| 5,782,770 A | 7/1998 | Mooradian et al. |
| 5,827,190 A | 10/1998 | Palcic et al. |
| 5,834,217 A | 11/1998 | Levine et al. |
| 5,932,872 A | 8/1999 | Price |
| 5,948,686 A | 9/1999 | Wardlaw |
| 5,985,595 A | 11/1999 | Krider et al. |
| 6,027,695 A | 2/2000 | Oldenburg et al. |
| 6,064,474 A | 5/2000 | Lee et al. |
| 6,074,879 A | 6/2000 | Zelmnanovic et al. |
| 6,101,404 A | 8/2000 | Yoon et al. |
| 6,262,423 B1 | 7/2001 | Hell et al. |
| 6,262,798 B1 | 7/2001 | Shepherd et al. |
| 6,320,979 B1 | 11/2001 | Melen |
| 6,339,472 B1 | 1/2002 | Hafeman et al. |
| 6,350,613 B1 | 2/2002 | Wardlaw et al. |
| 6,448,024 B1 | 9/2002 | Bruegger |
| 6,519,355 B2 | 2/2003 | Nelson |
| 6,554,788 B1 | 4/2003 | Hunley et al. |
| 6,582,964 B1 | 6/2003 | Samsoondar et al. |
| 6,611,777 B2 | 8/2003 | Samsoondar |
| 6,632,681 B1 | 10/2003 | Chu |
| 6,658,143 B2 | 12/2003 | Hansen et al. |
| 6,664,528 B1 | 12/2003 | Cartlidge et al. |
| 6,711,516 B2 | 3/2004 | Samsoondar |
| 6,819,408 B1 | 11/2004 | Scrivens et al. |
| 6,831,733 B2 | 12/2004 | Pettersson et al. |
| 6,834,237 B2 | 12/2004 | Noergaard et al. |
| 6,836,559 B2 | 12/2004 | Abdel-Fattah et al. |
| 6,842,233 B2 | 1/2005 | Narisada et al. |
| 6,866,823 B2 | 3/2005 | Wardlaw |
| 6,872,930 B2 | 3/2005 | Cartlidge et al. |
| 6,898,451 B2 | 5/2005 | Wuori |
| 6,903,323 B2 | 6/2005 | Cartlidge et al. |
| 6,929,953 B1 | 8/2005 | Wardlaw |
| 6,949,384 B2 | 9/2005 | Samsoondar |
| 6,955,872 B2 | 10/2005 | Maples et al. |
| 6,956,650 B2 | 10/2005 | Boas et al. |
| 6,989,891 B2 | 1/2006 | Braig et al. |
| 7,027,628 B1 | 4/2006 | Gagnon et al. |
| 7,030,351 B2 | 4/2006 | Wasserman et al. |
| 7,034,883 B1 | 4/2006 | Rosenqvist |
| 7,105,795 B2 | 9/2006 | Cartlidge et al. |
| 7,132,636 B1 | 11/2006 | Cartlidge et al. |
| 7,133,547 B2 | 11/2006 | Marcelpoil et al. |
| 7,151,246 B2 | 12/2006 | Fein et al. |
| 7,155,049 B2 | 12/2006 | Wetzel et al. |
| 7,248,716 B2 | 7/2007 | Fein et al. |
| 7,274,810 B2 | 9/2007 | Reeves et al. |
| 7,283,217 B2 | 10/2007 | Ikeuchi et al. |
| 7,288,751 B2 | 10/2007 | Cartlidge et al. |
| 7,305,109 B1 | 12/2007 | Gagnon et al. |
| 7,324,694 B2 | 1/2008 | Chapoulaud et al. |
| 7,329,537 B2 | 2/2008 | Qiu |
| 7,338,168 B2 | 3/2008 | Cartlidge et al. |
| 7,344,890 B2 | 3/2008 | Perez et al. |
| 7,346,205 B2 | 3/2008 | Walker, Jr. |
| 7,369,696 B2 | 5/2008 | Arini et al. |
| 7,385,168 B2 | 6/2008 | Cartlidge et al. |
| 7,411,680 B2 | 8/2008 | Chang et al. |
| 7,417,213 B2 | 8/2008 | Krief et al. |
| 7,439,478 B2 | 10/2008 | Cartlidge et al. |
| 7,450,223 B2 | 11/2008 | Ikeuchi et al. |
| 7,450,762 B2 | 11/2008 | Morell |
| 7,460,222 B2 | 12/2008 | Kalveram et al. |
| 7,490,085 B2 | 2/2009 | Walker et al. |
| 7,493,219 B1 | 2/2009 | Qi et al. |
| 7,580,120 B2 | 8/2009 | Hamada et al. |
| 7,599,893 B2 | 10/2009 | Sapir et al. |
| 7,601,938 B2 | 10/2009 | Cartlidge et al. |
| 7,602,954 B2 | 10/2009 | Marcelpoil et al. |
| 7,605,356 B2 | 10/2009 | Krief et al. |
| 7,609,369 B2 | 10/2009 | Simon-Lopez |
| 7,630,063 B2 | 12/2009 | Padmanabhan et al. |
| 7,633,604 B2 | 12/2009 | Ikeuchi et al. |
| 7,638,748 B2 | 12/2009 | Krief et al. |
| 7,663,738 B2 | 2/2010 | Johansson |
| 7,668,362 B2 | 2/2010 | Olson et al. |
| 7,692,131 B2 | 4/2010 | Fein et al. |
| 7,697,764 B2 | 4/2010 | Kataoka |
| 7,702,181 B2 | 4/2010 | Gouch |
| 7,706,862 B2 | 4/2010 | Alfano et al. |
| 7,713,474 B2 | 5/2010 | Schulman et al. |
| 7,747,153 B2 | 6/2010 | Ibaraki |
| 7,765,069 B2 | 7/2010 | Ostoich et al. |
| 7,777,869 B2 | 8/2010 | Nerin et al. |
| 7,787,109 B2 | 8/2010 | Dosmann et al. |
| 7,796,797 B2 | 9/2010 | Nakaya et al. |
| 7,863,552 B2 | 1/2011 | Cartlidge et al. |
| 7,869,009 B2 | 1/2011 | Dosmann et al. |
| 7,894,047 B2 | 2/2011 | Hamada et al. |
| 7,911,617 B2 | 3/2011 | Padmanabhan |
| 7,925,070 B2 | 4/2011 | Sumida et al. |
| 7,929,121 B2 | 4/2011 | Wardlaw et al. |
| 7,933,435 B2 | 4/2011 | Hunter et al. |
| 7,936,913 B2 | 5/2011 | Nordell et al. |
| 7,951,599 B2 | 5/2011 | Levine et al. |
| 7,995,200 B2 | 8/2011 | Matsumoto |
| 7,998,435 B2 | 8/2011 | Reed |
| 8,000,511 B2 | 8/2011 | Perz |
| 8,044,974 B2 | 10/2011 | Sumida et al. |
| 8,045,782 B2 | 10/2011 | Li et al. |
| 8,055,471 B2 | 11/2011 | Qi et al. |
| 8,064,680 B2 | 11/2011 | Ramoser et al. |

(56) References Cited

U.S. PATENT DOCUMENTS

| | | |
|---|---|---|
| 8,077,296 B2 | 12/2011 | Wardlaw et al. |
| 8,081,303 B2 | 12/2011 | Levine et al. |
| 8,105,554 B2 | 1/2012 | Kanigan et al. |
| 8,125,643 B2 | 2/2012 | Hansen et al. |
| D655,421 S | 3/2012 | Lee et al. |
| 8,131,035 B2 | 3/2012 | Grady et al. |
| 8,131,052 B2 | 3/2012 | Alexandrov |
| 8,150,114 B2 | 4/2012 | Svanberg et al. |
| 8,154,713 B2 | 4/2012 | Simon-Lopez |
| 8,165,385 B2 | 4/2012 | Reeves et al. |
| 8,175,353 B2 | 5/2012 | Westphal et al. |
| 8,184,273 B2 | 5/2012 | Dosmann et al. |
| 8,216,832 B2 | 7/2012 | Battrell et al. |
| 8,224,058 B2 | 7/2012 | Lindberg et al. |
| 8,269,954 B2 | 9/2012 | Levine et al. |
| 8,280,134 B2 | 10/2012 | Hoyt |
| 8,310,659 B2 | 11/2012 | Wardlaw et al. |
| 8,314,837 B2 | 11/2012 | Kenny et al. |
| 8,320,655 B2 | 11/2012 | Sarachan et al. |
| 8,331,627 B2 | 12/2012 | Xiong et al. |
| 8,331,642 B2 | 12/2012 | Zerfass et al. |
| 8,339,586 B2 | 12/2012 | Zahniser et al. |
| 8,345,227 B2 | 1/2013 | Zahniser et al. |
| 8,351,676 B2 | 1/2013 | Dai et al. |
| 8,363,221 B2 | 1/2013 | Hansen et al. |
| 8,379,944 B2 | 2/2013 | Grady et al. |
| 8,428,331 B2 | 4/2013 | DiMarzio et al. |
| 8,432,392 B2 | 4/2013 | Kim et al. |
| 8,477,294 B2 | 7/2013 | Zahniser et al. |
| 8,481,303 B2 | 7/2013 | Faris et al. |
| 8,488,111 B2 | 7/2013 | Zahniser et al. |
| 8,491,499 B2 | 7/2013 | Choi et al. |
| 8,526,704 B2 | 9/2013 | Dobbe |
| 8,565,480 B2 | 10/2013 | Eichhorn et al. |
| 8,570,496 B2 | 10/2013 | Chen |
| 8,582,924 B2 | 11/2013 | De La Torre-Bueno et al. |
| 8,638,427 B2 | 1/2014 | Wardlaw et al. |
| 8,712,142 B2 | 4/2014 | Rajpoot et al. |
| 8,736,824 B2 | 5/2014 | Matsui et al. |
| 8,744,165 B2 | 6/2014 | Liu et al. |
| 8,778,687 B2 | 7/2014 | Levine et al. |
| 8,792,693 B2 | 7/2014 | Satish et al. |
| 8,837,803 B2 | 9/2014 | Wang et al. |
| 8,849,024 B2 | 9/2014 | Shinoda et al. |
| 8,873,827 B2 | 10/2014 | McCulloch et al. |
| 8,877,458 B2 | 11/2014 | Maurer |
| 8,878,923 B2 | 11/2014 | Henderson et al. |
| 8,885,154 B2 | 11/2014 | Wardlaw et al. |
| 8,885,912 B2 | 11/2014 | Sui |
| 8,891,851 B2 | 11/2014 | Spaulding |
| 8,922,761 B2 | 12/2014 | Zahniser et al. |
| 8,942,458 B2 | 1/2015 | Takahashi et al. |
| 8,964,171 B2 | 2/2015 | Zahniser et al. |
| 8,994,930 B2 | 3/2015 | Levine et al. |
| 9,012,868 B2 | 4/2015 | Courtney et al. |
| 9,041,792 B2 | 5/2015 | Van Leeuwen et al. |
| 9,046,473 B2 | 6/2015 | Levine et al. |
| 9,050,595 B2 | 6/2015 | Miller et al. |
| 9,064,301 B2 | 6/2015 | Zie et al. |
| 9,088,729 B2 | 7/2015 | Takayama |
| 9,176,121 B2 | 11/2015 | Winkelman et al. |
| 9,186,843 B2 | 11/2015 | Chan et al. |
| 9,235,041 B2 | 1/2016 | Crandall |
| 9,240,043 B2 | 1/2016 | Christiansen et al. |
| 9,322,767 B2 | 4/2016 | Ehrenkranz |
| 9,329,129 B2 | 5/2016 | Pollak et al. |
| 9,332,190 B2 | 5/2016 | Murakami |
| 9,342,734 B2 | 5/2016 | Lin et al. |
| 9,349,208 B2 | 5/2016 | Eichhorn |
| 9,404,852 B2 | 8/2016 | Braig et al. |
| 9,470,609 B2 | 10/2016 | Wimberger-Friedl et al. |
| 9,477,875 B2 | 10/2016 | Ohya et al. |
| 9,522,396 B2 | 12/2016 | Bachelet et al. |
| 9,588,033 B2 | 3/2017 | Zahniser et al. |
| 9,767,343 B1 | 9/2017 | Jones et al. |
| 9,930,241 B2 | 3/2018 | Oshima et al. |
| 9,934,571 B2 | 4/2018 | Ozaki et al. |
| 10,024,858 B2 | 7/2018 | Smith et al. |
| 10,061,972 B2 | 8/2018 | Champlin et al. |
| 10,093,957 B2 | 10/2018 | Pollak et al. |
| 10,132,738 B2 | 11/2018 | Obrien et al. |
| 10,139,613 B2 | 11/2018 | Hing et al. |
| 10,169,861 B2 | 1/2019 | Ozaki et al. |
| 10,176,565 B2 | 1/2019 | Greenfield et al. |
| 10,269,094 B2 | 4/2019 | Fuchs |
| 10,281,386 B2 | 5/2019 | Hsu et al. |
| 10,353,190 B2 | 7/2019 | Hulsken et al. |
| 10,488,644 B2 | 11/2019 | Eshel et al. |
| 11,207,836 B2 | 12/2021 | Ramos et al. |
| 2002/0009711 A1 | 1/2002 | Wada et al. |
| 2002/0028158 A1 | 3/2002 | Wardlaw |
| 2002/0028471 A1 | 3/2002 | Oberhardt |
| 2003/0017085 A1 | 1/2003 | Kercso et al. |
| 2003/0161514 A1 | 8/2003 | Curry |
| 2003/0197925 A1 | 10/2003 | Hamborg |
| 2003/0224522 A1 | 12/2003 | de Jong et al. |
| 2003/0227612 A1 | 12/2003 | Fein et al. |
| 2003/0227673 A1 | 12/2003 | Nakagawa |
| 2003/0228038 A1 | 12/2003 | Douglass et al. |
| 2003/0231791 A1 | 12/2003 | Torre-Bueno et al. |
| 2004/0004614 A1 | 1/2004 | Bacus et al. |
| 2004/0132171 A1 | 7/2004 | Rule et al. |
| 2004/0170312 A1 | 9/2004 | Soenksen |
| 2004/0185447 A1 | 9/2004 | Maples et al. |
| 2004/0218804 A1 | 11/2004 | Affleck et al. |
| 2004/0240050 A1 | 12/2004 | Ogihara |
| 2004/0241677 A1 | 12/2004 | Lin et al. |
| 2004/0256538 A1 | 12/2004 | Olson et al. |
| 2005/0089208 A1 | 4/2005 | Dong et al. |
| 2005/0109959 A1 | 5/2005 | Wasserman et al. |
| 2005/0270611 A1 | 12/2005 | Oshiro et al. |
| 2005/0282292 A1 | 12/2005 | Torre-Bueno |
| 2005/0286800 A1 | 12/2005 | Gouch |
| 2006/0001955 A1 | 1/2006 | Kinney et al. |
| 2006/0007345 A1 | 1/2006 | Olson et al. |
| 2006/0045505 A1 | 3/2006 | Zeineh et al. |
| 2006/0063185 A1 | 3/2006 | Vannier |
| 2006/0098861 A1 | 5/2006 | See et al. |
| 2006/0187442 A1 | 8/2006 | Chang et al. |
| 2006/0210428 A1 | 9/2006 | Lindberg et al. |
| 2006/0223052 A1 | 10/2006 | MacDonald et al. |
| 2006/0223165 A1 | 10/2006 | Chang et al. |
| 2007/0054350 A1 | 3/2007 | Walker |
| 2007/0243117 A1 | 10/2007 | Wardlaw |
| 2007/0250301 A1 | 10/2007 | Vaisberg et al. |
| 2007/0252984 A1 | 11/2007 | Van Beek et al. |
| 2008/0012978 A1 | 1/2008 | Wang |
| 2008/0020128 A1 | 1/2008 | van Ryper et al. |
| 2008/0059135 A1 | 3/2008 | Murugkar et al. |
| 2008/0118399 A1 | 5/2008 | Fleming |
| 2008/0187466 A1 | 8/2008 | Wardlaw |
| 2008/0212069 A1 | 9/2008 | Goldberg et al. |
| 2008/0260369 A1 | 10/2008 | Ibaraki |
| 2008/0273776 A1 | 11/2008 | Krief et al. |
| 2008/0305514 A1 | 12/2008 | Alford et al. |
| 2009/0046909 A1 | 2/2009 | Rutenberg et al. |
| 2009/0066934 A1 | 3/2009 | Gao et al. |
| 2009/0075324 A1 | 3/2009 | Pettersson |
| 2009/0128618 A1 | 5/2009 | Fahn et al. |
| 2009/0185734 A1 | 7/2009 | Lindberg et al. |
| 2009/0191098 A1 | 7/2009 | Beard et al. |
| 2009/0195688 A1 | 8/2009 | Henderson et al. |
| 2009/0213214 A1 | 8/2009 | Yamada |
| 2009/0238437 A1 | 9/2009 | Levine et al. |
| 2009/0258347 A1 | 10/2009 | Scott |
| 2009/0269799 A1 | 10/2009 | Winkelman et al. |
| 2009/0291854 A1 | 11/2009 | Wiesinger-Mayr et al. |
| 2010/0104169 A1 | 4/2010 | Yamada |
| 2010/0112631 A1 | 5/2010 | Hur et al. |
| 2010/0120129 A1 | 5/2010 | Amshey et al. |
| 2010/0152054 A1 | 6/2010 | Love |
| 2010/0157086 A1 | 6/2010 | Segale et al. |
| 2010/0172020 A1 | 7/2010 | Price |
| 2010/0234703 A1 | 9/2010 | Sterling et al. |

(56) References Cited

U.S. PATENT DOCUMENTS

| | | |
|---|---|---|
| 2010/0254596 A1 | 10/2010 | Xiong |
| 2010/0256918 A1 | 10/2010 | Chen et al. |
| 2010/0265323 A1 | 10/2010 | Perz |
| 2010/0300563 A1 | 12/2010 | Ramunas et al. |
| 2011/0007178 A1 | 1/2011 | Kahlman |
| 2011/0009163 A1 | 1/2011 | Fletcher et al. |
| 2011/0030458 A1 | 2/2011 | Paark et al. |
| 2011/0102571 A1 | 5/2011 | Yoneyama |
| 2011/0123398 A1 | 5/2011 | Carrilho et al. |
| 2011/0144480 A1 | 6/2011 | Lu et al. |
| 2011/0149097 A1 | 6/2011 | Danuser et al. |
| 2011/0151502 A1 | 6/2011 | Kendall et al. |
| 2011/0178716 A1 | 7/2011 | Krockenberger et al. |
| 2011/0212486 A1 | 9/2011 | Yamada et al. |
| 2011/0249910 A1 | 10/2011 | Henderson et al. |
| 2011/0260055 A1 | 10/2011 | Wang et al. |
| 2011/0275111 A1 | 11/2011 | Pettigrew et al. |
| 2011/0301012 A1 | 12/2011 | Dolecek et al. |
| 2012/0002195 A1 | 1/2012 | Wu et al. |
| 2012/0007977 A1 | 1/2012 | Yamamoto et al. |
| 2012/0021951 A1 | 1/2012 | Hess et al. |
| 2012/0030618 A1 | 2/2012 | Leong et al. |
| 2012/0044342 A1 | 2/2012 | Hing et al. |
| 2012/0058504 A1 | 3/2012 | Li et al. |
| 2012/0092477 A1 | 4/2012 | Kawano et al. |
| 2012/0120221 A1 | 5/2012 | Dong et al. |
| 2012/0162495 A1 | 6/2012 | Ogawa |
| 2012/0169863 A1 | 7/2012 | Bachelet et al. |
| 2012/0225446 A1 | 9/2012 | Wimberger-Friedl et al. |
| 2012/0249770 A1 | 10/2012 | Hamm et al. |
| 2012/0288157 A1 | 11/2012 | Kishima |
| 2012/0312957 A1 | 12/2012 | Loney et al. |
| 2012/0320045 A1 | 12/2012 | Yao et al. |
| 2013/0016885 A1 | 1/2013 | Tsujimoto |
| 2013/0023007 A1 | 1/2013 | Zahniser et al. |
| 2013/0078668 A1 | 3/2013 | Levine et al. |
| 2013/0100272 A1 | 4/2013 | Price et al. |
| 2013/0130262 A1 | 5/2013 | Battrell et al. |
| 2013/0170730 A1 | 7/2013 | Yu et al. |
| 2013/0176551 A1 | 7/2013 | Wardlaw et al. |
| 2013/0258058 A1 | 10/2013 | Watanabe |
| 2013/0273968 A1 | 10/2013 | Rhoads et al. |
| 2013/0284924 A1 | 10/2013 | Mizuochi et al. |
| 2013/0290225 A1 | 10/2013 | Kamath et al. |
| 2014/0139625 A1 | 5/2014 | Mathuis et al. |
| 2014/0139630 A1 | 5/2014 | Kowalevicz |
| 2014/0186859 A1 | 7/2014 | Calderwood et al. |
| 2014/0205176 A1 | 7/2014 | Obrien et al. |
| 2014/0347459 A1 | 11/2014 | Greenfield et al. |
| 2015/0006105 A1 | 1/2015 | Zhou et al. |
| 2015/0037806 A1 | 2/2015 | Pollack et al. |
| 2015/0124082 A1 | 5/2015 | Kato et al. |
| 2015/0168705 A1 | 6/2015 | O'Neill |
| 2015/0190063 A1 | 7/2015 | Zakharov et al. |
| 2015/0278575 A1 | 10/2015 | Allano et al. |
| 2015/0302237 A1 | 10/2015 | Ohya et al. |
| 2015/0316477 A1 | 11/2015 | Pollak et al. |
| 2016/0208306 A1 | 7/2016 | Pollak et al. |
| 2016/0246046 A1 | 8/2016 | Yorav Raphael et al. |
| 2016/0279633 A1 | 9/2016 | Bachelet et al. |
| 2017/0052110 A1 | 2/2017 | Malissek et al. |
| 2017/0160185 A1 | 6/2017 | Minemura et al. |
| 2017/0218425 A1 | 8/2017 | Chen et al. |
| 2017/0307496 A1 | 10/2017 | Zahniser et al. |
| 2017/0328924 A1 | 11/2017 | Jones et al. |
| 2018/0246313 A1 | 8/2018 | Eshel et al. |
| 2018/0296102 A1 | 10/2018 | Satish et al. |
| 2019/0002950 A1 | 1/2019 | Pollak et al. |
| 2019/0087953 A1 | 3/2019 | Yorav-Raphael et al. |
| 2019/0347467 A1 | 11/2019 | Ohsaka et al. |

FOREIGN PATENT DOCUMENTS

| | | | | |
|---|---|---|---|---|
| EP | 0073551 | | 3/1983 | |
| EP | 0479231 | | 4/1992 | |
| EP | 1 381 229 A1 | | 1/2004 | |
| EP | 1698883 | | 9/2006 | |
| EP | 2145684 A2 | | 1/2010 | |
| EP | 3001174 | | 3/2016 | |
| EP | 3 123 927 A1 | | 2/2017 | |
| EP | 2211165 | | 7/2017 | |
| EP | 3482189 | | 5/2019 | |
| EP | 1 873 232 B1 | | 2/2020 | |
| JP | 61198204 | | 9/1986 | |
| JP | H11-73903 A | | 3/1999 | |
| JP | 2000-199845 | | 7/2000 | |
| JP | 2003315684 A | * | 11/2003 | ........... G02B 21/244 |
| JP | 2004-257768 | | 9/2004 | |
| JP | 2006294301 A | * | 10/2006 | ............... H01J 37/04 |
| JP | 2006-301270 | | 11/2006 | |
| JP | 2007-040814 | | 2/2007 | |
| JP | 2007093470 A | * | 4/2007 | ........... G01N 15/147 |
| JP | 2017-209530 A | | 11/2017 | |
| WO | 1985/005446 A1 | | 12/1985 | |
| WO | 1996/001438 A1 | | 1/1996 | |
| WO | 1996/012981 | | 5/1996 | |
| WO | 1996/013615 A1 | | 5/1996 | |
| WO | 2000/006765 A1 | | 2/2000 | |
| WO | 2000/052195 A1 | | 9/2000 | |
| WO | 2000/055572 | | 9/2000 | |
| WO | 2002/033400 A1 | | 4/2002 | |
| WO | 02/39059 A1 | | 5/2002 | |
| WO | 2003/056327 A1 | | 7/2003 | |
| WO | 2003/073365 | | 9/2003 | |
| WO | 2003/081525 A1 | | 10/2003 | |
| WO | 2004/111610 | | 12/2004 | |
| WO | 2005/121863 | | 12/2005 | |
| WO | 2006/121266 | | 11/2006 | |
| WO | 2008/063135 | | 5/2008 | |
| WO | 2010/056740 | | 5/2010 | |
| WO | 2010/116341 A1 | | 10/2010 | |
| WO | 2010/126903 | | 11/2010 | |
| WO | 2011/076413 A1 | | 6/2011 | |
| WO | 2011/123070 A1 | | 10/2011 | |
| WO | 2011/143075 A2 | | 11/2011 | |
| WO | 2012/000102 | | 1/2012 | |
| WO | 2012/030313 | | 3/2012 | |
| WO | WO-2012107468 A1 | * | 8/2012 | ............. G02B 21/06 |
| WO | 2012/090198 | | 11/2012 | |
| WO | 2012/154333 | | 11/2012 | |
| WO | 2013/041951 A1 | | 3/2013 | |
| WO | 2013/098821 | | 7/2013 | |
| WO | 2014/159620 | | 10/2014 | |
| WO | 2014/188405 | | 11/2014 | |
| WO | 2015/001553 | | 1/2015 | |
| WO | 2015/029032 | | 3/2015 | |
| WO | 2016/030897 A1 | | 3/2016 | |
| WO | 2017/046799 A1 | | 3/2017 | |
| WO | 2017/168411 A1 | | 10/2017 | |
| WO | 2017/195205 A1 | | 11/2017 | |
| WO | 2017/195208 A1 | | 11/2017 | |
| WO | 2018/009920 A1 | | 1/2018 | |
| WO | 2019/035084 | | 2/2019 | |
| WO | 2019/097387 A1 | | 5/2019 | |
| WO | 2019/102277 | | 5/2019 | |
| WO | 2019/198094 | | 10/2019 | |
| WO | 2021/079305 A1 | | 4/2021 | |
| WO | 2021/079306 A1 | | 4/2021 | |

OTHER PUBLICATIONS

A European Examination Report dated Dec. 10, 2021 which issued during the prosecution of Applicant's European App No. 15778059.4.

A European Search Report dated Dec. 14, 2016, which issued during the prosecution of Applicant's European App No. 14800352.8.

A European Search Report dated Mar. 23, 2017, which issued during the prosecution of Applicant's European App No. 14839661.7.

A Final Office Action dated Jul. 29, 2019 from the United States Patent and Trademark Office in U.S. Appl. No. 14/914,329.

(56) References Cited

OTHER PUBLICATIONS

A Notice of Allowance issued on Jan. 27, 2021 for U.S. Appl. No. 16/592,335.
A Notice of Allowance issued on May 13, 2021 for U.S. Appl. No. 16/592,335.
Agero, U., Mesquita, L.G., Neves, B.R.A., Gazzinelli, R.T. and Mesquita, O.N., 2004. Defocusing microscopy. Microscopy research and technique, 65(3), pp. 159-165.
Ahirwar, Neetu, Sapnojit Pattnaik, and Bibhudendra Acharya. "Advanced image analysis based system for automatic detection and classification of malarial parasite in blood images." International Journal of Information Technology and Knowledge Management 5.1 (2012): 59-64.
An Advisory Action dated Dec. 27, 2019 which issued during the prosecution of U.S. Appl. No. 14/914,329.
An Examination Report for Indian Application No. 201727008982 on Jan. 29, 2021.
An Extended European Search Report issued for European Patent Application No. 21154596.7 on Jul. 23, 2021.
An Extended European Search Report issued for European Patent Application No. 21194040.8 on Jan. 18, 2022.
An Indian Examination Report dated Apr. 22, 2020. which issued during the prosecution of Indian App No. 201617009399.
An International Preliminary Report on Patentability dated Feb. 28, 2017, which issued during the prosecution of Applicant's PCT/IL2015/050864.
An International Search Report and a Written Opinion both dated Feb. 12, 2015, which issued during the prosecution of Applicant's PCT/IL2014/050770.
An International Search Report and a Written Opinion both dated Jan. 15, 2016, which issued during the prosecution of Applicant's PCT/IL2015/050864.
An International Search Report and a Written Opinion both dated Sep. 29, 2014, which issued during the prosecution of Applicant's PCT/IL2014/050423.
An International Search Report and Written Opinion for Application No. PCT/IB2020/061731 issued on Feb. 22, 2021.
An International Search Report and Written Opinion for PCT Application No. PCT/IB2020/061732 mailed on May 7, 2021.
An Office Action dated Apr. 4, 2019, which issued during the prosecution of U.S. Appl. No. 14/914,329.
An Office Action dated Jun. 13, 2017, which issued during the prosecution of U.S. Appl. No. 14/285,672.
An Office Action dated Mar. 26, 2018, which issued during the prosecution of U.S. Appl. No. 14/285,672.
An Office Action dated Mar. 3, 2022, which issued during the prosecution of U.S. Appl. No. 17/063,320.
An Office Action dated Mar. 9, 2020 which issued during the prosecution of U.S. Appl. No. 16/232,124.
An Office Action dated Oct. 5, 2016, which issued during the prosecution of U.S. Appl. No. 14/285,672.
Anand, A., et al. "Automatic identification of malaria-infected RBC with digital holographic microscopy using correlation algorithms." Photonics Journal, IEEE 4.5 (2012): 1456-1464.
Bacus, J.W., 1985. Cytometric approaches to red blood cells. Pure and Applied Chemistry, 57(4), pp. 593-598.
Ben-Suliman—2018—Computerized Counting-Based System for Acute Lymphoblastic Leukemia Detection in Microscopic Blood Images: 27th International Conference on Artificial Neural Networks, Rhodes, Greece, Oct. 4-7, 2018, Proceedings, Part II.
Bovik, Alan C., ed. "The essential guide to image processing", chapter 27, "Computer assisted Microscopy", pp. 777-831, Academic Press, 2009.
Bravo-Zanoguera, M.E., Laris, C.A., Nguyen, L.K., Oliva, M. and Price, J.H., 2007. "Dynamic autofocus for continuous-scanning time-delay-and-integration image acquisition in automated microscopy", Journal of biomedical optics, 12(3), pp. 034011-1-034011-16.

C. Briggs, et al., "Continuing developments with the automated platelet count", Blackwell Publishing Ltd, International Journal of Laboratory Hematology, Jan. 18, 2007, pp. 77-91, vol. 29 (15 pages total).
Centers for Disease Control and Prevention. "DPDx—Laboratory Identification of Parasitic Diseases of Public Health Concern", <http://www.cdc.gov/dpdx/diagnosticProcedures/blood/microexam.html>, Nov. 29, 2013.
Emma Eriksson et al: "Automated focusing of nuclei for time lapse experiments on single cells using holographic optical tweezers", Optics Express vol. 17, No. 7, Mar. 24, 2009 pp. 5585-5594.
Frean, John. "Microscopic determination of malaria parasite load: role of image analysis." Microscopy: Science, technology, Applications, and Education (2010) : 862-866.
Groen F C A et al: :A Comparison of Different Focus Functions for Use in Autofocus Algorithms, Cytometry, Alan Liss, New York, US, vol. 6, No. 2, Mar. 1, 1985 (Mar. 1, 1985), pp. 81-91.
Guy, Rebecca, Paul Liu, Peter Pennefather and Ian Crandall, "The use of fluorescence enhancement to improve the microscopic diagnosis of falciparum malaria", Malaria Journal 2007 6:89, https://malariajournal.biomedcentral.com/articles/10.1186/1475-2875-6-89, (Jul. 9, 2007).
Hiremath, P.S,. et al,. "Automated Identification and Classification of White Blood Cells (Leukocytes) in Digital Microscopic Images", IJCA Special Issue on "Recent Trends in Image Processing and Pattern Recognition" RTIPPR, 2010.
Houri-Yafin, A., et al. "An enhanced computer vision platform for clinical diagnosis of malaria." Malar Control Elimin 5.138.10 (2016): 4172.
International Search Report and Written Opinion for PCT Application No. PCT/IB2020/061728 mailed on May 7, 2021.
International Search Report and Written Opinion for PCT Application No. PCT/IB2020/061736 mailed on May 3, 2021.
International Search Report issued for PCT Application No. PCT/IB2020/059924 on Mar. 22, 2021.
International Search Report issued for PCT Application No. PCT/IB2020/059925 on Mar. 26, 2021.
International Search Report issued for PCT Application No. PCT/IB2020/061724 on Mar. 18, 2021.
Invitation to pay fees and Partial Search Report issued for PCT Application No. PCT/IB2020/059924 on Jan. 28, 2021.
Invitation to pay fees and Partial Search Report issued for PCT Application No. PCT/IB2020/059925 on Feb. 4, 2021.
Invitation to pay fees and Partial Search Report issued for PCT Application No. PCT/IB2020/061728 on Mar. 15, 2021.
Invitation to pay fees and Partial Search Report issued for PCT Application No. PCT/IB2020/061732 on Mar. 10, 2021.
Invitation to pay fees and Partial Search Report issued for PCT Application No. PCT/IB2020/061736 on Mar. 12, 2021.
Brenner, et al., "An Automated Microscope for Cytologic Research a Preliminary Evaluation", The Journal of Histochemistry and Cytochemistry, 1976, pp. 100-111, vol. 24, No. 1 (12 pages total).
Jahanmehr, S A H et al., "Simple Technique for Fluorescence Staining of Blood Cells with Acridine Orange", Journal of Clinical Pathology, Feb. 12, 1987, pp. 926-929 (4 pages total).
Kawamoto, F. and P. F. Billingsley. "Rapid diagnosis of malaria by fluorescence microscopy." Parasitology today 8.2 (1992): 69-71.
Kawamoto, Fumihiko, "Rapid diagnosis of malaria by fluorescence microscopy with light microscope and interference filter". The Lancet, vol. 337, pp. 200-202, Jan. 26, 1991.
Knesel, "Roche Image Analysis Systems, Inc.", Acta Cytologica, vol. 40, pp. 60-66, (1996).
Le, et al., "A novel semi-automatic image processing approach to determine Plasmodium falciparum parasitemia in Giemsa-stained thin blood smears", BMC Cell Biology, Mar. 28, 2008 (pp. 1-12).
Leif, "Methods for Preparing Sorted Cells as Monolayer Specimens", Springer Lab Manuals, Section 7—Chapter 5, pp. 592-619, (2000).
Life Technologies Corporation, "Counting blood cells with Countless Automated Cell Counter" found at http://www.lifetechnologies.com/content/dam/LifeTech/migration/files/cell-tissue-analysis/pdfs.par.83996.file.dat/w-082149-countless-application-blood-cells.pdf, four pages, (2009).

(56) References Cited

OTHER PUBLICATIONS

An Office Action dated Sep. 2, 2022 which issued during the prosecution of U.S. Appl. No. 17/063,320.
Matcher, S. J., M. Cope, and D. T. Delpy. "Use of the water absorption spectrum to quantify tissue chromophore concentration changes in near-infrared spectroscopy." Physics in medicine and biology 39.1 (1994): 177.
Moody, "Rapid Diagnostic Tests for Malaria Parasites", Clinical Microbiology Reviews, vol. 15, No. 1, pp. 66-78, (2002).
Moon S, Lee S, Kim H, Freitas-Junior LH, Kang M, Ayong L, et al. (2013) "An Image Analysis Algorithm for Malaria Parasite Stage Classification and Viability Quantification.", PLoS ONE 8(4): e61812. https://doi.org/10.1371/journal.pone.0061812.
Non-Final Office Action dated Oct. 6, 2021, which issued during the prosecution of U.S. Appl. No. 17/063,320.
Notice of Allowance dated Jun. 24, 2021 which issued during the prosecution of U.S. Appl. No. 16/232,124.
Notice of Allowance dated Mar. 20, 2019, which issued during the prosecution of U.S. Appl. No. 15/506,997.
Omucheni et al. "Application of principal component analysis to multispectral-multimodal optical image analysis for malaria diagnostics", Malaria Journal 2014, 13:485 http://www.malariajournal.com/content/13/1/485.
Ortyn, William E., et al. "Extended depth of field imaging for high speed cell analysis." Cytometry Part A 71.4 (2007): 215-231.
Osibote, O. A., et al. "Automated focusing in bright-field microscopy for tuberculosis detection." Journal of microscopy 240.2 (2010): 155-163.
Panel Decision dated Mar. 2, 2020 which issued during the prosecution of U.S. Appl. No. 14/914,329.
Piruska, et al., "The autofluorescence of plastic materials and chips measured under laser irradiation", The Royal Society of Chemistry, Lap Chip, vol. 5, 2005 (pp. 1348-1354).
Price, Jeffrey H., and David A. Gough. "Comparison of phase—contrast and fluorescence digital autofocus for scanning microscopy." Cytometry 16.4 (1994): 283-297.
Purwar, Yashasvi, et al. "Automated and unsupervised detection of malarial parasites in microscopic images." Malaria journal 10.1 (2011): 364.
Putzu, et al., "Leucocyte classification for leukaemia detection using image processing techniques.", Artificial Intelligence in Medicine, vol. 63, No. 3, Nov. 1, 2014.
Ran, Qiong et al. "Spatial-spectral blood cell classification with microscopic hyperspectral imagery", Proc. SPIE 10461, AOPC 2017: Optical Spectroscopy and Imaging, 1046102 (Oct. 24, 2017).
Rappaz, Benjamin, et al. "Comparative study of human erythrocytes by digital holographic microscopy, confocal microscopy, and impedance volume analyzer." Cytometry Part A 73.10 (2008): 895-903.
Roma, P. M. S., et al. "Total three-dimensional imaging of phase objects using defocusing microscopy: Application to red blood cells." Applied Physics Letters 104.25 (2014): 251107.
An Office Action dated Nov. 10, 2022 which issued during the prosecution of U.S. Appl. No. 17/362,009.
Ross, Nicholas E., et al. "Automated image processing method for the diagnosis and classification of malaria on thin blood smears." Medical and Biological Engineering and Computing 44.5 (2006): 427-436.
Saraswat, et al. "Automated microscopic image analysis for leukocytes identification: A survey", ABV—Indian Institute of Information Technology and Management, Gwalior, India, Micron, 2014, vol. 65, pp. 20-33.
Sheikh, et al., "Blood Cell Identification Using Neural Networks", IEEE, 1996 (p. 119-120).
Shen, Feimo, Louis Hodgson, and Klaus Hahn. "Digital autofocus methods for automated microscopy." Methods in enzymology 414 (2006): 620-632.
Shute, G. T., and T. M. Sodeman. "Identification of malaria parasites by fluorescence microscopy and acridine orange staining." Bulletin of the World Health Organization, 48.5 (1973): 591.
Sun, Yu, S. Duthaler and B.J. Nelson, "Autofocusing algorithm selection in computer microscopy", 2005 IEEE/RSJ International Conference on Intelligent Robots and Systems.
Tek, F. Boray, Andrew G. Dempster, and Izzet Kale. "Computer vision for microscopy diagnosis of malaria." Malaria Journal 8.1 (2009): 153.
Thung, Ferdian, and Iping Supriana Suwardi. "Blood parasite identification using feature based recognition." Electrical Engineering and Informatics (ICEEI), 2011 International Conference on. IEEE, 2011.
U.S. Appl. No. 61/870,106, filed Aug. 26, 2013.
U.S. Appl. No. 62/042,388, filed Aug. 27, 2014.
UNITAID Malaria Diagnostic Technology And Market Landscape, 2nd Edition (2014).
Varga, et al., "An automated scoring procedure for the micronucleus test by image analysis,", Mutagenesis vol. 19 No. 5 pp. 391-397, 2004.
Vink, J. P.,etal. "An automatic vision based malaria diagnosis system."Journal of microscopy 250.3(2013): 166-178.
Wissing, et al., "Illumination of the Malaria Parasite Plasmodium falciparum Alters Intracellular pH", The Journal of Biological Chemistry, vol. 277, No. 40, Oct. 4, 2002 (pp. 37747-37755).
Witt, et al. "Establishing traceability of photometric absorbance values for accurate measurements of the haemoglobin concentration in blood.",Metrologia 50 (2013) 539-548.
Wu, Qiang, Fatima Merchant, and Kenneth Castleman. "Microscope image processing", Chapter 16, "Autofocusing", pp. 441-467, Academic press, 2010.
Xu, Lili, Asok Chaudhuri, "Plasmodium yoelii: A differential fluorescent technique using Acridine Orange to identify infected erythrocytes and reticulocytes in Duffy knockout mouse", Experimental Parasitology, vol. 110, Issue 1, May 2005, pp. 80-87, https://www.sciencedirect.com/science/article/pii/S001448940500038X, (May 31, 2005).
Notice of Allowance issued for U.S. Appl. No. 17/362,009 on Mar. 21, 2023.
Yang, Ming, and Li Luo. "A rapid auto-focus method in automatic microscope." Signal Processing, 2008, ICSP 2008. 9th International Conference on. IEEE, 2008.
Yazdanfar, S., Kenny, K.B., Tasimi, K., Corwin, A.D., Dixon, E.L. and Filkins, R.J., 2008. Simple and robust image-based autofocusing for digital microscopy. Optics express, 16(12), pp. 8670-8677.
Zahniser et al., Automated Slide Preparation System for the Clinical Laboratory, Cytometry, vol. 26, No. 10, pp. 30-64, (1996).
An International Search Report and a Written Opinion dated Sep. 17, 2021, for International Application No. PCT/IB2021/056073.
Cervantes, Serena , Jacques Prudhomme, David Carter, Krishna G Gopi, Qian Li, Young-Tae Chang, and Karine G Le Roch, High-content live cell imaging with RNA probes: advancements in high-throughput antimalarial drug discovery, BMC Cell Biology 2009, 10:45, https://bmcmolcellbiol.biomedcentral.com/track/pdf/10.1186/1471-2121-10-45 (Jun. 10, 2009).
Chong, Shau Poh, Shilpa Pant, and Nanguang Chen. "Line-scan Focal Modulation Microscopy for Rapid Imaging of Thick Biological Specimens." SPIE/OSA/IEEE Asia Communications and Photonics. International Society for Optics and Photonics, 2011.
Hoover Karl "SimpleAutofocus.cpp—Micro-Manager Device Adapter Code", Dec. 31, 2009.
Keiser, J. et al., "Acridine Orange for malaria diagnosis: its diagnostic performance, its promotion and implementation in Tanzania, and the implications for malaria control", Annals of Tropical Medicine and parasitology, 96.7 (2002): 643-654.
MetaXpress® 6 Software Guide, Configuring Image-Based Autofocus During Acquisition—2015.
MicroManager Documentation: SimpleAutofocus—2009.
Non-Final Office Action dated Jun. 25, 2021 which issued during the prosecution of U.S. Appl. No. 16/706,159.
D5-Micro-Manager—User's-Guide—Micro-Manager—2016.
Gordon, Andrew et al. "Single-cell quantification of molecules" Nature Methods 4, Jan. 21, 2007, pp. 175-181.
Gordon, Andrew et al. Supplementary Note to Gordon et al: "Single-cell quantification of molecules" Nature Methods, Jan. 21, 2007, pp. 1-35.

(56) References Cited

OTHER PUBLICATIONS

Notice of Allowance dated Jul. 10, 2019 in U.S. Appl. No. 15/506,997.
Poon et al., "Automated Image Detection and Segmentation in Blood Smears", [Cytometry 1992 13:766-774].
Wu, Caicai et al., "Feasibility study of the spectroscopic measurement of oxyhemoglobin using whole blood without pre-treatment", The Analyst, Mar. 1998, pp. 477-481, vol. 123 (5 pages total).
An Office Action dated Jan. 6, 2023 which issued during the prosecution of U.S. Appl. No. 17/063,320.
A Chinese Office Action dated Dec. 19, 2019 for Chinese Application No. 201580058510.7.
A European Examination Report dated Dec. 11, 2019 which issued during the prosecution of Applicant's European App No. 14800352.8.
A European Examination Report dated Jan. 7, 2020 which issued during the prosecution of Applicant's European App No. 15778059.4.
An Office Action dated Nov. 16, 2018 which issued during the prosecution of U.S. Appl. No. 14/914,329.
Fohlen-Walter, Anne PhD, et al., "Laboratory Identification of Cryoglobulinemia From Automated Blood Cell Counts, Fresh Blood Samples, and Blood Films", American Society for Clinical Pathology, Am J Clin Pathol, 2002, pp. 606-614, vol. 117 (9 pages total).
A Notice of Allowance issued on May 14, 2021 for U.S. Appl. No. 16/232,124.
An Office Action dated Feb. 17, 2023 which issued during the prosecution of U.S. Appl. No. 17/576,023.
An Office Action dated Jan. 19, 2021 for application No. 16/706,159.
Notice of Allowance dated Jun. 22, 2023 which issued during the prosecution of U.S. Appl. No. 17/576,023.
An Office Action dated Sep. 14, 2023 which issued during the prosecution of U.S. Appl. No. 17/063,320.
Office Action dated Feb. 1, 2024 which issued during the prosecution of U.S. Appl. No. 18/214,568.
An Office Action dated May 16, 2024 which issued during the prosecution of U.S. Appl. No. 17/063,320.
Notice of Allowance dated May 31, 2024 which issued during the prosecution of U.S. Appl. No. 18/214,568.

* cited by examiner $$\text{Var}(I) = E[(I_{i,j} - E[I])^2]$$

| | 1 | 2 | ... | ... | ... | p |
|---|---|---|---|---|---|---|
| n | $I_{1,n}$ | | | | | $I_{p,n}$ |
| ... | | | | | | |
| ... | | | | | | |
| 2 | $I_{1,2}$ | | | | | |
| 1 | $I_{1,1}$ | $I_{2,1}$ | | | | $I_{p,1}$ |

FIG. 3

METHOD AND SYSTEM FOR IMAGING A CELL SAMPLE

CROSS-REFERENCE TO RELATED APPLICATIONS

The present application is a continuation of U.S. patent application Ser. No. 17/576,023 to Greenfield et al. (published as US 2022/0138944), filed Jan. 14, 2022, entitled "Method and system for imaging a cell sample,"
which is a continuation of U.S. patent application Ser. No. 16/706,159 to Greenfield et al. (issued as U.S. Pat. No. 11,295,440), filed Dec. 26, 2019, entitled "Method and system for imaging a cell sample,"
which is a continuation of U.S. patent application Ser. No. 16/232,124 to Greenfield et al. (issued as U.S. Pat. No. 11,100,634), filed Dec. 26, 2018, entitled "Method and system for imaging a cell sample,"
which is a continuation of U.S. patent application Ser. No. 14/285,672 to Greenfield et al. (issued as U.S. Pat. No. 10,176,565), filed May 23, 2014, entitled "Method and system for imaging a cell sample,"
which claims priority from U.S. Provisional Patent Application No. 61/826,718 to Greenfield et al., filed May 23, 2013, entitled "Method and system for imaging a cell sample."

TECHNOLOGICAL FIELD

The present disclosure relates to the field of microscopy. More particularly, the present disclosure relates to a system and method for imaging cell samples using a digital microscope.

BACKGROUND

Observation of a sample with a microscope generally requires three dimensional adjustment of focus. Indeed, imaging a specific zone of a sample to be investigated (also referred to as investigation zone) may require both alignment of the investigation zone on an optical axis of the microscope (also referred to as XY-positioning) and superposition of the investigation zone with a focus plane of the microscope (also referred to as Z-positioning). These adjustments may be performed automatically using an autofocus system cooperating with the microscope.

Autofocus systems relative to the Z-positioning may perform a depth scanning of the sample over a scanning depth interval by varying a distance between the focus plane of the microscope and a movable carrier intended to receive the sample and thereafter compute a focus function for the images captured while scanning the sample in depth. Numerous functions which are expected to be at a maximum when the image reaches a highest level of sharpness or contrast have been proposed in the literature for focusing optical instruments because proper focus intuitively relates to image sharpness and/or contrast. For example, such functions involve determination of standard deviation, absolute-value deviation from a mean, entropy and differentials (gradient or Laplacian) of an image area. FIG. 1 illustrates a typical focus curve representing variations of such function with the position of the focus plane along the Z axis (optical axis) which may be obtained by carrying out such classical methods on a sample wherein a selected investigation level $Z_{inv}$ is derived by the position corresponding to the maximum of the function.

GENERAL DESCRIPTION

The Applicant has found a new and useful method and system for determining a reference depth level within a cell sample and imaging a cell sample.

The present disclosure provides a method of determining a reference depth level within a cell sample. The method comprises obtaining data representative of a series of images captured by performing a depth scan of the cell sample using a digital microscope, the series of images being associated with a series of depth levels of the cell sample; processing said data for detecting at least one depth level corresponding to a drop in image contrast; and identifying the detected depth level as the reference depth level.

In some embodiments, the detected depth level is such that image contrast at the detected depth level is lower than image contrast associated with a depth level immediately preceding the detected depth level in the series of depth levels and lower than image contrast associated with a depth level immediately following the detected depth level in the series of depth levels.

In some embodiments, the method further comprises determining a deepness of the drop in image contrast.

In some embodiments, the method further comprises obtaining data representative of an additional series of images associated with an additional series of depth levels and a scanning depth interval of the additional series of images is wider than a scanning depth interval of the series of images.

In some embodiments, the method further comprises determining for the series of images a deepness of the drop in image contrast and the obtaining of data representative of an additional series of images is performed when the deepness of the drop is below a predetermined deepness threshold.

In some embodiments, a plurality of drops in image contrast are detected and the method further comprises identifying the depth level corresponding to the deepest drop as the reference depth level.

In some embodiments, processing the series of images comprises computing, for each image, a contrast related value enabling to derive the image contrast of each image.

In some embodiments, the method further comprises calculating image contrast using a contrast function increasing with the image contrast and wherein detecting at least one depth level corresponding to a drop in image contrast comprises detecting a well in a contrast curve representing image contrast as a function of the depth level.

In some embodiments, the detected depth level corresponds to a bottom of the well in the contrast curve.

In some embodiments, the method further comprises determining the deepness of a well by: determining a right and left boundary depth levels at which the contrast function becomes inferior to the well bottom contrast; determining a right and left highest contrast values reached by the contrast function between the well bottom depth level and respectively the right and left boundary depth levels; and calculating the minimum of: a difference between the right highest contrast value and the well bottom contrast and a difference between the left highest contrast value and the well bottom contrast.

In some embodiments, the method further comprises calculating image contrast using a contrast function decreasing with the image contrast and wherein detecting at least one depth level corresponding to a drop in image contrast comprises detecting a roof of a contrast curve representing image contrast as a function of the depth level.

In some embodiments, the detected depth level corresponds to a top of the roof of the contrast curve.

In some embodiments, the method further comprises determining the deepness of a roof by: determining a right and left boundary depth levels at which the contrast function becomes superior to the rooftop contrast; determining a right and left lowest contrast values reached by the contrast function between the roof top depth level and respectively the right and left boundary depth levels; and calculating the minimum of: the difference between the roof top contrast and the right lowest contrast value, and the difference between the roof top contrast and the left lowest contrast value.

In some embodiments, the method further comprises obtaining one or more supplemental depths levels associated to supplemental contrast values by interpolating and/or extrapolating the contrast curve and wherein the reference depth level is one of the one or more supplemental depth levels.

In some embodiments, obtaining the series of images comprises scanning a scanning depth interval of the cell sample using a digital microscope.

In some embodiments, a first scanning depth and a second scanning depth are endpoints of the series of depth levels and the method further comprises verifying that a first distance between the reference depth level and the first scanning depth and/or a second distance between the reference depth level and the second scanning depth are respectively above a first and/or second predetermined threshold.

In some embodiments, a span of the series of depth levels is of 5 to 1000 micrometers.

In some embodiments, a span of the series of depth levels is less than 50 micrometers.

In some embodiments, the method further comprises determining an estimated reference depth level and wherein the series of depth levels covers the estimated reference depth level.

In some embodiments, image contrast is calculated by a contrast function decreasing with the image contrast and further comprising transforming the contrast function into an increasing function of the contrast.

The present disclosure further provides a method of imaging a cell sample using a microscope, comprising: determining a reference depth level according to the method previously described; and focusing the microscope at an investigation level based on the determined reference depth level.

In some embodiments, the method further comprises capturing one or more fluorescent lighting images of the cell sample.

In some embodiments, focusing the microscope at an investigation level further comprises shifting a focus plane of the digital microscope from the reference depth level by a predetermined value.

In some embodiments, the cell sample comprises predominantly red blood cells.

In some embodiments, the cell sample is essentially a monolayer of cells.

In some embodiments, the image contrast of an image is calculated from any of the following contrast functions: variance, standard deviation, sum of absolute-value of derivatives.

The present disclosure provides also an autofocus computation module for a digital microscope. The autofocus computation module comprises: an input unit configured for receiving from the digital microscope data representative of a series of images captured by performing a depth scan of the cell sample using a digital microscope, the series of images being associated with a series of depth levels of the cell sample; a calculation unit configured for processing said data for detecting at least one depth level corresponding to a drop in image contrast and identifying the detected depth level as the reference depth level; and an output unit for outputting data indicative of the reference depth level.

The present disclosure provides also an autofocus system for a digital microscope comprising: an autofocus adaptation module configured for commanding the digital microscope to vary a distance between a focus plane of the microscope and a sample carrier intended to receive a cell sample for performing a depth scan of the cell sample thereby providing a series of digital images associated with a set of distances between the focus plane and the sample carrier; the autofocus computation module previously described, wherein the input unit is configured for receiving said series of digital images and the output unit is configured for outputting data indicative of the reference depth level to the autofocus adaptation module.

In some embodiments, the autofocus adaptation module is further configured for commanding the digital microscope to set the focus plane at the reference depth level.

In some embodiments, the autofocus adaptation module is further configured to set the focus plane at an investigation level corresponding to the reference depth level shifted of a predetermined value.

The present disclosure provides also a microscope system comprising: an imaging module comprising an optical unit configured for forming a magnified image of a cell sample by conjugating a focus plane and an image plane; and an image sensor unit positioned in the image plane of the optical unit; a focus variation module capable of varying a distance between the focus plane and a sample carrier intended to receive the cell sample; the autofocus system previously described, the autofocus system cooperating with the focus variation module and the image sensor unit.

Further, it is understood that the term "well" is used to refer to a point or a region of a curve where the curve passes from decreasing (curving down) to increasing (curving up). It is understood that the term well refers to a drop of contrast. In the following, it is generally considered that contrast function is such that a drop of contrast between two images generates a drop in the contrast function values (i.e. the contrast function is an increasing function of the image contrast). However, it is noted that if the contrast function is a function decreasing with the contrast, a drop of contrast would generate an increase in the contrast function thereby turning a "well" into a "roof". It will be appreciated that a decreasing function can be transformed into an increasing function of the contrast by multiplying said function by −1. Therefore, the present disclosure also applies to decreasing function of the contrast. It will also be appreciated that another way of applying the teaching of the present invention to a decreasing function of the contrast would be to determine a "roof" instead of a well for a decreasing contrast function of the contrast (i.e. contrast functions so that a drop of contrast generates an increase in the contrast function values), wherein the roof refers to a point or a region of the curve where the curve passes from increasing (curving up) to decreasing (curving down). However, since in the art most contrast functions are increasing with the contrast, the present disclosure refers generally without any limitation to a well.

Furthermore, it is noted that the term "bottom" of the well should be understood as the minimum point within a well and that the term "top of a roof" should be understood as a maximum point within a roof. It is also understood that the term "series" refers to an ordered set of values. In particular, the series of depth levels may be arranged in increasing or decreasing order.

It is also appreciated that the present disclosure also applies to functions which are usually classified in the art as representative of sharpness and that the expression "contrast function" should be understood as referring generally to contrast and/or sharpness function i.e. functions for assessing a contrast and/or sharpness of an image.

Furthermore, the term cooperation and its derivatives refer to an operative connection which may include communication between components.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 3 illustrates an image variance calculation according to some embodiments of the present disclosure;

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known features, structures, characteristics, stages, methods, procedures, modules, components and systems, have not been described in detail so as not to obscure the present invention.

Unless specifically stated otherwise, as apparent from the following discussions, it is appreciated that throughout the specification discussions utilizing terms such as "processing", "calculating", "computing", "determining", "generating", "configuring", "selecting", "defining", or the like, include action and/or processes of a computer that manipulate and/or transform data into other data, said data represented as physical quantities, e.g. such as electronic quantities, and/or said data representing the physical objects. The terms "computer" and "processor" should be expansively construed to cover any kind of electronic device with data processing capabilities.

The operations in accordance with the teachings herein may be performed by a computer specially constructed for the desired purposes or by a general purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
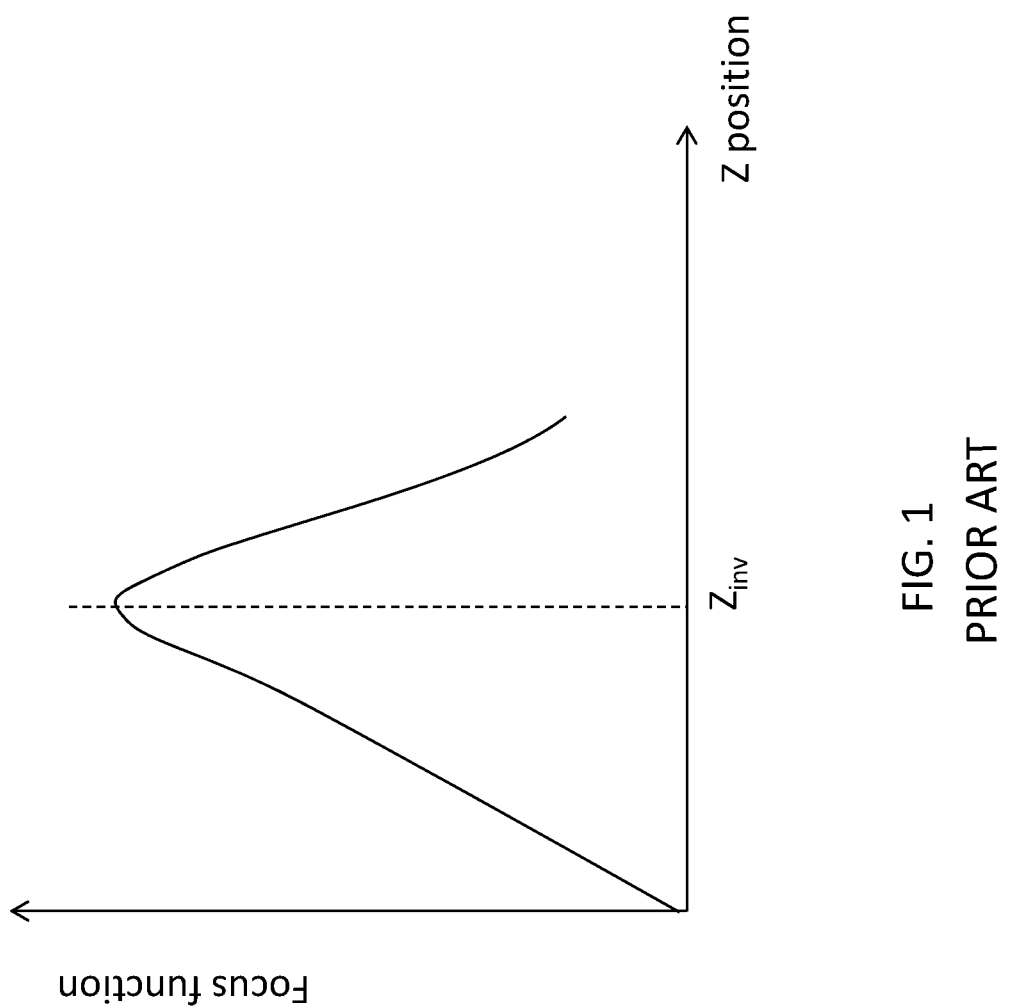
FIG. 1, already described, illustrates a focus curve for determining an investigation level according to the prior art.
Figure 2:
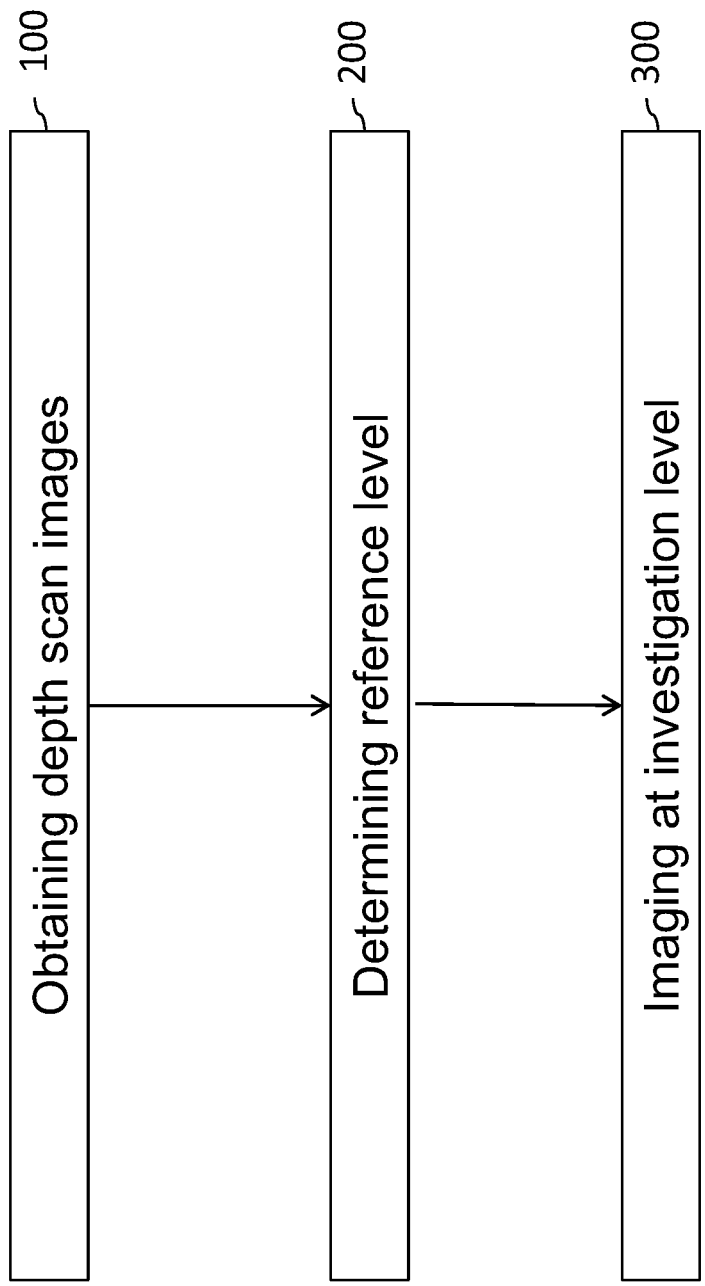
FIG. 2 is a flow chart illustrating steps of a method of imaging a cell sample according to some embodiments of the present disclosure.

FIG. 2 illustrates generally steps of a method of imaging a cell sample according to some embodiments of the present disclosure. The imaging method includes in a first stage, a method of determining a reference depth level within a cell sample and, in a second stage, focusing a digital microscope at an investigation level derived from the depth reference level. The method of determining a reference depth level may be carried out on a computing module. Advantageously, the computing module may belong to an autofocus system of the microscope. The step of focusing the microscope may be performed automatically upon command by the autofocus system. The cell sample may comprise red blood cells and may optionally be a cell monolayer comprising red blood cells.

In 100, a series of images (also referred to as a set of images) representative of light captured by focusing a digital microscope at a corresponding series of depths levels within the cell sample is obtained. It is understood that the term "obtain data representative of a series of images" encompasses both actual imaging of the cell sample to acquire the set of images (in-depth scanning) and respective data, and also loading/downloading from a computer storage media the data relating to a set of images preliminarily acquired by a digital microscope. In some embodiments, obtaining depth scan images comprises in-depth scanning of the cell sample with a digital microscope and obtaining the set of images can be carried out using an image sensor unit of the microscope connected with a computing module so as to provide the in-depth images (i.e. images captured during in-depth scanning) to the computing module. In some embodiments, in-depth scanning may be performed with brightfield illumination.

The set (series) of images may be understood as a series of slices of the cell sample corresponding to different positions along the Z axis (optical axis of the microscope). Each image may be associated with a depth level. Optionally one or more images are associated with depth levels within the cell sample that are above or below the cells in cell sample. Optionally one or more images are associated with depth levels that are above or below the cell sample. The set of images may result from an in-depth scanning of the cell sample. Such in-depth scanning may for example be carried out by varying a distance between a focus plane of the microscope and a sample carrier intended to accommodate the cell sample by methods well known in the art.

Further, the term depth level may be understood as a coordinate value along the optical axis of the microscope corresponding to a position that is optionally inside the cell sample. The actual direction of the axis and the origin of the axis to quantify depth may be arbitrarily chosen. The images may be obtained at any order, and may have an equal distance along the axis between pairs of consequent images or at a varying distance i.e. the in-depth scanning may be performed with a fixed step or with a variable step. For example, the origin of the axis may be positioned at an outer surface of the cell sample facing an objective of the microscope and the direction of the coordinate axis may be chosen so that the coordinates increase when progressing toward the cell sample. It is also understood that since the series of depth levels may be understood as an ordered set along the axis, it is possible to define endpoint depth levels (hereinafter referred to as endpoints) of the series of depth levels. In the following, the term scanning depth interval refers to a series of depth levels between two endpoints' depth levels. One endpoint level of a series of depth levels, for example a minimum depth level of the set, may be referred to as a first scanning depth levels and the other endpoint of the set, for example the maximum depth level, may be referred to as a second scanning depth level. In such case, the scanning depth interval refers to the depth levels comprised between the first and second scanning depth levels.

In some embodiments, an estimated reference depth level may be preliminarily provided. For example, the cell sample may comprise a plurality of fields to be investigated and reference depth levels determined for one or more previous fields may be used to estimate the estimated reference level for a subsequent field. In these embodiments, the scanning depth interval may be selected so as to cover the estimated depth reference level i.e. distances between the estimated depth reference level and the first and second scanning depth levels may be above a predetermined threshold. In some embodiments, a span of the depth scanning interval may be of around 5 micrometers to 1000 micrometers. In some embodiments, the span of the depth scanning interval may be between 150 and 250 micrometer, or less than 50 micrometers or even between 10 and micrometers. Optionally, the estimated depth level is approximately in the midpoint of the span of the depth scanning interval.

In 200, the series of images and associated depth levels (or the data representative thereof) are processed for detecting at least one depth level corresponding to a drop in image contrast and the detected depth level is identified to be the reference depth level. The detected depth level may be such that an image contrast at the detected depth level is lower than the image contrast at immediately preceding and following the reference depth level (i.e. adjacent depth levels) in the series of depth levels. The drop in image contrast may be understood as a drop of image contrast over depth level (i.e. as a function of depth level). It is noted that when the contrast function used to calculate the image contrast is increasing with the contrast, 200 may be carried out by to detecting a well of a contrast curve representing image contrast as a function of depth level. Image contrast of an image may be provided by applying a contrast function to the image. A well is considered to be formed on the contrast curve when a contrast function value is inferior at least to the previous and subsequent adjacent contrast function values. In the following, some embodiments are described in which the image contrast is provided by the calculation of variance. It is understood that other functions can be contemplated to determine the contrast of an image. The set of images associated with the series of depth levels within the cell sample enables to analyze variations of an image parameter as a function of the depth level. In some embodiments, image variance may be computed for every image of the set of obtained images.

Figure 3:
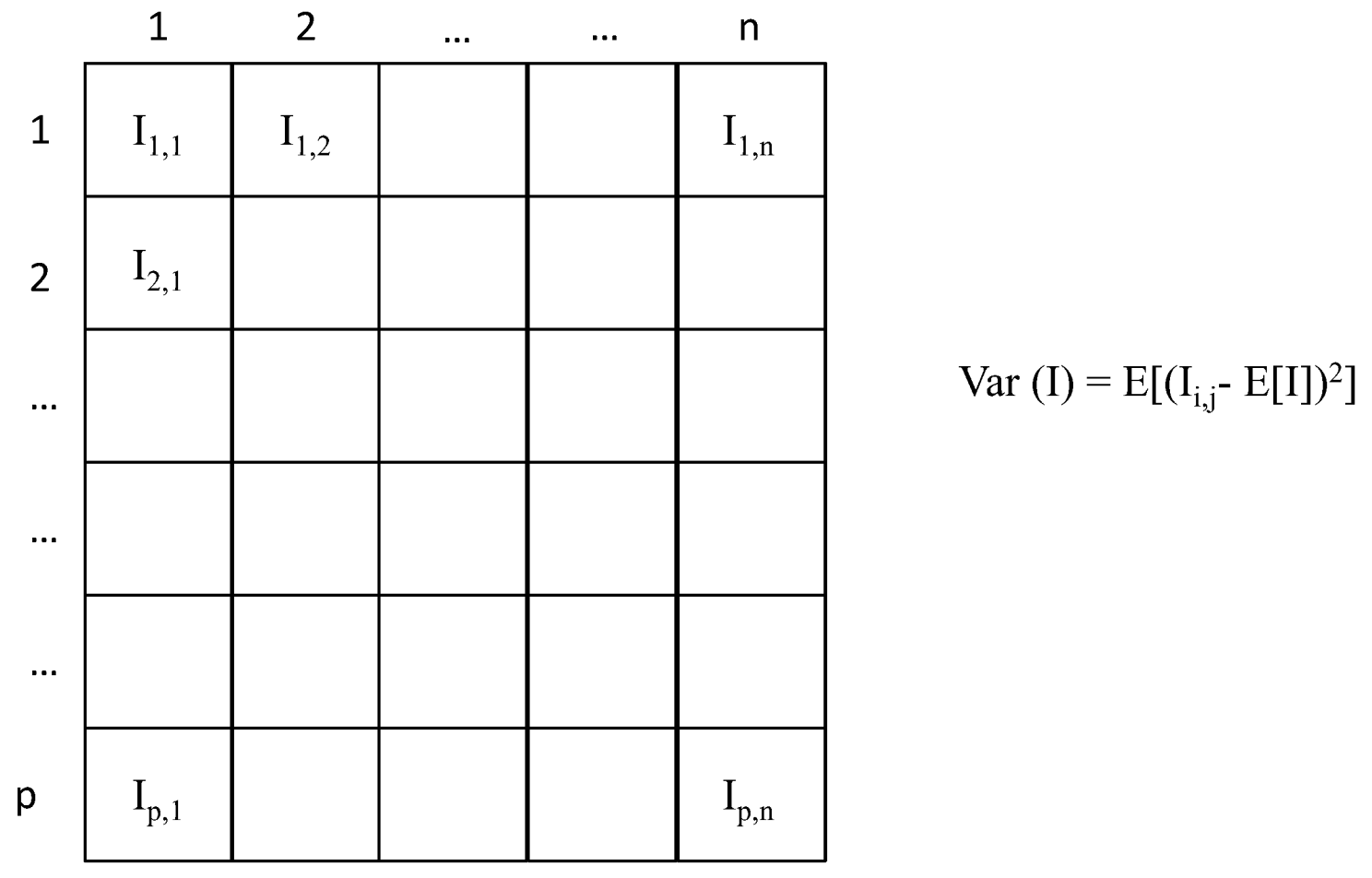

FIG. 3 illustrates image variance calculation on an example image I comprising n*p pixels (n, p integers) of pixel intensity $I_{i,j}$ wherein $1 \le i \le n$ and $1 \le j \le p$. The variance can be expressed as follows:

$$\mathrm{Var}(I) = E[(I_{i,j} - E(I))^2],$$

wherein E(I) is the mean value of the pixel intensity $I_{i,j}$ over the example image. In some embodiments, a variance related value may be computed for each image of the set of images. It is understood that the variance related value encompasses transformations of the image variance enabling to derive the image variance i.e. transformations equivalent to image variance calculation, for example standard deviation.

As explained above, the reference depth level may correspond to a minimum point within a well of the contrast curve (i.e. a local drop of contrast). The contrast curve may be defined as a curve representing the values of the contrast function (for example image variance) as a function of the Z-coordinate of the focus plane during the depth scanning. In some embodiments, the reference depth level may correspond to the Z-position of a minimum point within a deepest well of the contrast curve. As explained above, a well may also be defined as a point where the curve passes from decreasing to increasing. The processing for deriving the reference depth level may comprise detecting one or more minimum points within wells i.e. points of the contrast curve at which the contrast function value is inferior to both adjacent points i.e. the minimum point within the well is below the contrast function value of the previous and subsequent points.

The deepness of the well may also be determined for example in order to find the deepest well of the contrast curve or in order to proceed to another depth scan if the deepness of all the identified wells of the contrast curve are below a minimal deepness threshold.

Determining a deepness of a well may comprise determining the height of at least one wall of the well. In some embodiments, the height of a wall may be defined as the absolute value of a difference between the contrast function value at the minimum point within the well (well contrast value) and the contrast function value at the aperture of the well (or maximum point at the aperture of the well). The aperture of the well may be detected by comparing subsequent values of the focus function.

In some other embodiments, determining the deepness of the well may comprise (1) determining a right and left boundary depth levels at which the contrast function value becomes inferior to the well contrast value; (2) determining a right and left highest contrast function values reached by the focus function between the well depth level and respectively the right and left boundary depth levels and (3) calculating the minimum of the differences between the well contrast value and the right and left highest variance values, wherein the minimum is the deepness of the well. These embodiments can be regarded as basing the deepness of a well on the minimum amount needed to be climbed over the contrast curve to reach a lower contrast function value than the contrast function value at the considered well (well bottom contrast).

In some embodiments, the processing may further comprise a verification step comprising verifying that the deepness of the deepest detected well is above a predetermined threshold and may further include repeating the in-depth scanning with a wider span if the deepness of the deepest well is below said threshold.

In some cases, several local minima (wells) may be found for a set of images, in which case one of the minima is selected to define the reference depth level. Optionally this is performed as follows: The variance value for each minimum is compared with the variance values of adjacent portions of the curve, for example within a comparison range of ±5 micrometers from the depth level associated with the minimum. Based on this comparison, each minimum is associated with a "variance deepness value". The variance deepness value is a function (e.g. ratio) between the variance value of the minimum point and the highest variance value associated any point of the curve within the comparison range. In the example shown in FIG. 5, the variance value of the minimum point 37 is $V_{37}$, and the variance deepness value is a function of $V_{37}$ and the variance value $V_{38}$ that is associated with the high point 38 (e.g. the variance deepness value equals $V_{37}/V_{38}$). Optionally, the reference point is defined as the minimum having the lowest variance deepness value.

If the comparison range comprises a low point that has a variance value that is equal to or lower than that of the local minimum for which a variance deepness value is calculated, the highest point that will be used for this calculation may be the highest point between the local minimum and the nearest additional low point in the comparison range.

Optionally, the variance deepness value must exceed a predetermined threshold for a local minimum to be selected. For example, if no minimum is found having a variance deepness value that is 0.9 or less, or even 0.8 or less, no reference depth level is defined. In such cases, 100 may be repeated such that a new series of depth scan images is obtained and a new minimum is found. Optionally, the first series of depth scan images corresponds with a first scanning depth interval and the second set of images corresponds with a second scanning depth interval being different than the first scanning depth interval. Optionally, the second scanning depth interval is larger than the first scanning depth interval. Optionally both the first and second scanning depth intervals cover the estimated reference depth level. Optionally the first scanning depth interval spans less than 50 micrometers, for example between 10 and 30 micrometers. Optionally, the second scanning depth intervals spans between 100 and 1000 micrometers, for example between 150 and 250 micrometers.

In a variant, detection of the depth reference level may be performed by searching for a lower bound of the contrast function on a restricted depth level interval. For example, the restricted interval may exclude a region near the endpoints of the depth scanning interval. Further, the processing may comprise detecting whether the depth reference level is sufficiently distant from the endpoints of the depth scanning interval. In some embodiments, detection of the reference depth level may comprise identifying two maxima depth levels at which the focus function reaches maxima (or roofs). In some embodiments, the two maxima may be detected as the points where the contrast function passes from increasing to decreasing. The reference depth level may be detected by searching for the lower bound of the focus function on the restricted interval consisting of the depth levels between the two identified maxima depth levels.

The well (or deepest well) may be reached for a given depth level of the series of depth levels. Alternatively, the reference depth level may be extrapolated or interpolated from the series of depth levels and associated images. For example, in a preliminary step, supplemental points may be interpolated and/or extrapolated on the contrast curve and one of these supplemental points may correspond to the well (or deepest well) of the contrast curve. For example, the supplemental points may be interpolated as being in-between two depth levels of the series of depth levels.

It is understood that implementation of the present disclosure does not require generation of the actual curve representing the variation of the contrast function over depth level but that a search for a well (or a roof if the contrast function is decreasing with the contrast) can be performed mathematically using the image representative data In some embodiments, the cell sample may comprise predominantly red blood cells. In some embodiments, the cell sample may essentially be a monolayer of cells, wherein at least 80% of the cells or even at least 90% of the cells have direct contact with the surface on which the cell sample is held. In the context of imaging blood samples, the Applicant has found that the proposed method based on determining a reference depth level corresponding to a minimum of variance (contrast and/or sharpness) over the in-depth scanning may be particularly advantageous.

Indeed, the proposed method can be performed using brightfield illumination and provide with appropriate results for further investigation using fluorescent illumination. This may lead to reducing focus time because performing focus on fluorescent images is typically slower than when using brightfield, since obtaining fluorescent images typically requires longer exposure periods. Further, obtaining fluorescent images for focusing purpose may be problematic because fluorescent imaging is known to degrade the fluorescent response of the sample due to photo-bleaching.

Figure 4:
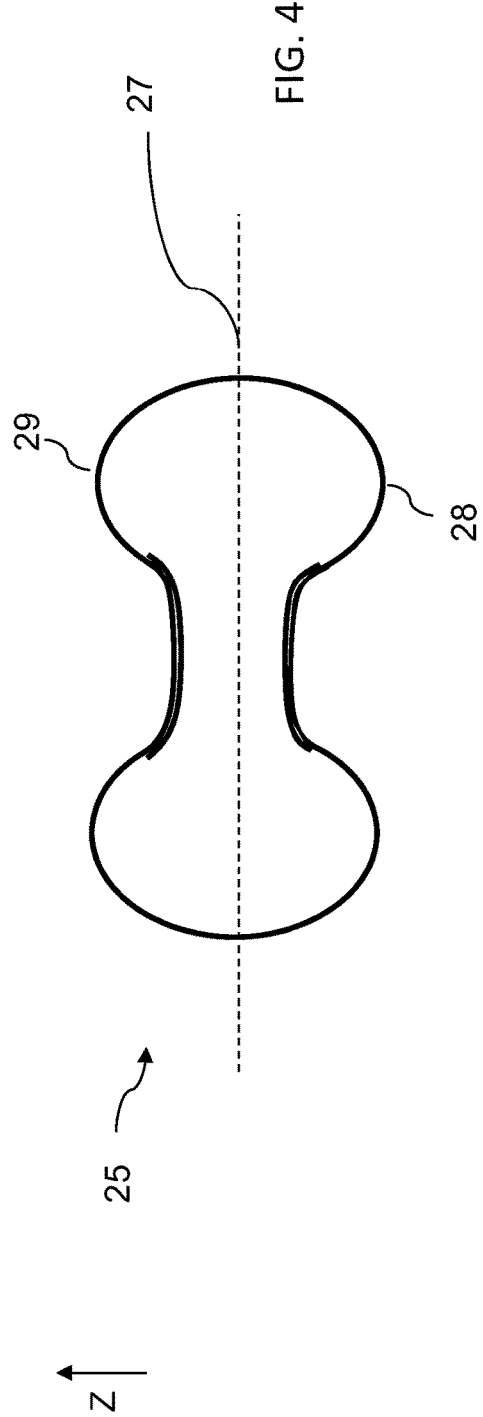
FIG. 4 illustrates schematically a red blood cell under investigation according to some embodiments of the present disclosure.
Figure 5:
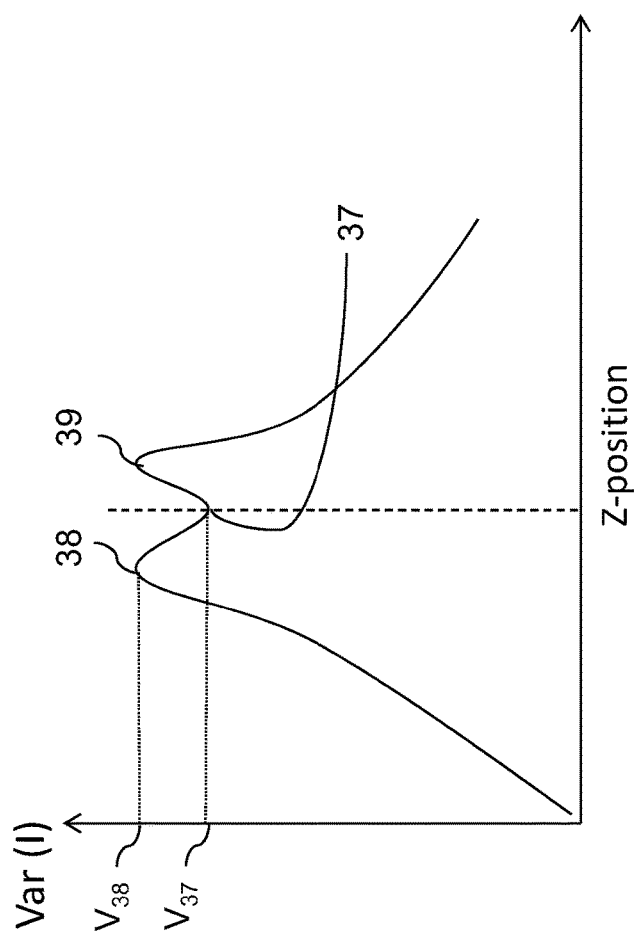
FIG. 5 illustrates a focus curve obtained by depth scanning of a cell sample and computing of a focus function according to some embodiments of the present disclosure.

In brightfield illumination of blood samples, the most visibly abundant object is generally red blood cells. Healthy red blood cells are characterized by a distinctive biconcave shape as schematically illustrated by FIG. 4 in which a blood cell 25 is depicted. Blood cell 25 may be characterized as having a midplane 27. The Applying contrast-based functions and/or sharpness based functions to brightfield microscopy of a blood sample containing mostly red blood cells (for example a blood sample) may yield graphs qualitatively similar to that shown in FIG. 5. FIG. 5 illustrates a curve representing variations of image variance (image contrast) over scanning depth level. The curve notably comprises a well 37 embraced between two maxima 38, 39 (in this example a saddle point which is a local minimum, but not an absolute one).

The Applicant found that the depth level corresponding to the well 37 provides an efficient reference level providing robust and consistent results across different microscope hardware including different forms of brightfield illumination and different forms of sample preparation (dry thin smears, wet smears and microfluidic preparation). Moreover, a focus position based on the well 37 position provides a baseline for epifluorescent imaging. The Applicant contemplates that the two maxima 38, 39 may be correlated to the bottom and top convex part 28, 29 of the blood cell previously illustrated on FIG. 4 and the well 37 (which is also a local minimum) may be correlated to the midplane 27.

Therefore, imaging at the reference depth level or in its vicinity may provide efficient parasite detection. The Applicant further found that the consistency of the focus generated by the proposed method of determining a minimum of the contrast function may be explained as follows: the maxima 38, 39 surrounding the well 37 typically fall within 1 micrometer of each other. Consequently, the well 37 is steep thereby causing discernible shifts in the contrast function even for shifts of depth level of about a tenth of a micron. It is appreciated that having a consistent reference level within a cell sample enables to establish reliable automated diagnosis.

In 300 of FIG. 2, the digital microscope may be focused at an investigation level based on the determined reference level. In some embodiments, the investigation level may be equal to the reference level. In some embodiments, the investigation level may be shifted by a predetermined value with respect to the reference level. For example, this value may be in the range of 0.2-3 micrometers, or about 1-2 micrometers or about 1.5 micrometer. In some embodiments, switching to an investigation level that is different than the reference depth value enables to increase the contrast and/or sharpness of the image while preserving the consistency provided by the aforementioned method of determining a reference depth level. As explained above, focusing the microscope at the investigation level may enable to investigate the cell sample. In some embodiments, the investigation may be carried out with fluorescent illumination and/or with brightfield illumination. In some embodiments, the investigation level will provide a sharp image (or even the sharpest and/or highest contrast image).

Figure 6:
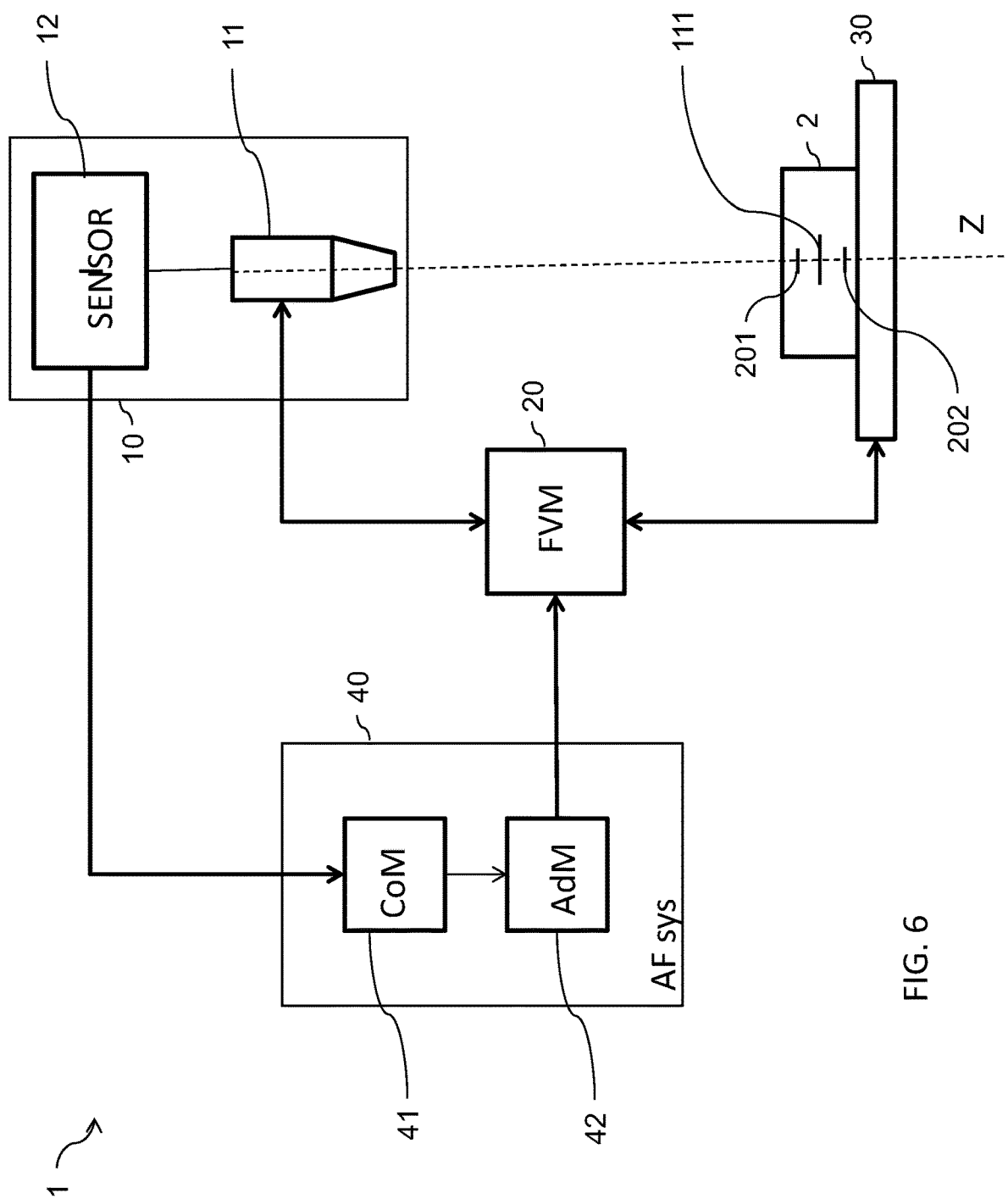
FIG. 6 is a diagram illustrating a system according to some embodiments of the present disclosure.

FIG. 6 illustrates a microscope system 1 for investigating a cell sample 2 in some embodiments of the present disclosure adapted to carry out the methods previously described. The microscope system 1 may comprise an imaging module 10, a focus variation module 20, a sample carrier 30 and an autofocus system 40.

The imaging module 10 may comprise an optical unit 11 and an image sensor unit 12. Optical unit 11 may be configured for forming a magnified image of a sample (for example cell sample 2) by conjugating a focus plane 111 and an image plane. The image sensor unit 12 may comprise an image sensor, for example a charge-coupled-device (CCD), complementary metal-oxide-semiconductor (CMOS) sensor, matrix sensor, positioned in the image plane of the optical unit 11 so as to sense the magnified image. The sensor image unit 11 may output digital images acquired to a screen display (not shown) and/or to the autofocus system 40.

The focus variation module 20 may be configured to vary a distance between the focus plane 111 of the optical unit 11 and the sample carrier 30. The focus variation module 20 may be operated manually or automatically via a mechanical interface which may for example modify the position of the sample carrier 30 along an optical axis Z of the optical unit 11. Further, the focus variation module 20 may be commanded by the autofocus system 40. For example, the focus variation module 20 may vary the distance between the sample carrier 30 and the focus plane by (1) modifying the position of the optical unit 11 along the optical axis Z, (2) modifying the position of the sample carrier 30 along the position of the optical axis Z, (3) modifying the position of the focus plane by for example changing a focal length of the optical unit 11, or a combination thereof.

The sample carrier 30 may comprise a plate or stage. The sample carrier 30 may be configured to accommodate the cell sample 2. The carrier may be any carrier known in the art for holding a biological sample. Optionally, the bottom surface of the carrier is essentially flat, to allow cells in contact therewith to be at about the same distance from the focal plane of the microscope. Examples include carrier slides, laboratory receptacles, dishes, plates, multi-well plates, test tubes (e.g. with a flat bottom), microfluidic cells and cartridges and the like.

Autofocus system 40 may comprise an autofocus computation module 41 and an autofocus adaption module 42. The autofocus computation module may be connected to the image sensor module 12 so as to receive images acquired by the imaging module 10. The autofocus adaptation module may be connected to the focus variation module 20 so as to be capable of commanding the focus variation module 20.

The autofocus adaptation module 42 may be configured for commanding a depth scanning of the cell sample 2. In order to do so, the autofocus adaptation module 42 may be configured for commanding the focus variation module 20 to set the focus plane of the optical unit 11 at a series of depth levels within the cell sample 2 so as to perform the depth scanning of the cell sample 2 between a first scanning depth level 201 and a second scanning depth level 202. Further, upon output of the reference depth level by the autofocus computing module 41, the autofocus adaptation module 42 may be further configured for commanding the focus variation module 20 to set the focus plane of the optical unit 11 at an investigation depth level. The investigation depth level may be the reference depth level or may be derived by shifting of a predetermined value the reference depth level.

The autofocus computation module 41 may be configured for implementing the method of determining a reference depth level described hereinabove and to output the reference depth level to the autofocus adaptation module 42. The autofocus computation module may comprise an input unit configured for receiving the set of in-depth images from the image sensor unit 12; a calculation unit configured for processing the set of images to derive a reference depth level corresponding to a well of a contrast curve representing an image contrast function of the depth level; and an output unit configured for outputting data indicative of the reference depth level. Upon receipt of the depth scan images by the image sensor unit 12, the calculation unit may process the set of images to derive the reference depth level. The image contrast may be defined by image variance or by other functions representative of the contrast and/or the sharpness of an image as described above. The determination of the reference depth level at which the image contrast drops (is at a minimum value within a well) may include computing for each depth scan image an image variance (or an image variance related value).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

The invention claimed is:
1. A method for use with a blood sample that includes a plurality of cells, the method comprising:
    acquiring a series of images associated with a series of depth levels of the blood sample, by performing a depth scan of red blood cells in the blood sample with a microscope, under a brightfield illumination condition;

determining image contrast for the images acquired at at least some of the depth levels;

identifying one of the depth levels as being an optimum focal plane for imaging the red blood cells within the blood sample using the microscope, under the brightfield illumination condition, by identifying that a drop in image contrast occurs at the identified depth level relative to the image contrast of images acquired at depth levels within a given range of distances from the identified depth level; and imaging the blood sample under a fluorescent illumination condition, using the microscope, by focusing the microscope at an investigative depth level that is based on the identified depth level.

2. The method according to claim 1, wherein focusing the microscope at the investigative depth level that is based on the identified depth level further comprises shifting a focus plane of the microscope from the identified depth level by a predetermined value.

3. The method according to claim 1, wherein identifying one of the depth levels as the optimum focal plane comprises identifying that the identified depth level is such that image contrast at the identified depth level is lower than image contrast associated with a depth level immediately preceding the identified depth level in the series of depth levels and lower than image contrast associated with a depth level immediately following the identified depth level in the series of depth levels.

4. The method according to claim 1, wherein identifying that the drop in image contrast occurs at the identified depth level comprises calculating image contrast using a contrast function selected from the group consisting of: variance, standard deviation, and sum of absolute-value of derivatives.

5. The method according to claim 1, further comprising, prior to acquiring the series of images, allowing the blood sample to form a monolayer.

6. The method according to claim 5, wherein allowing the sample to form the monolayer comprises:

introducing the blood sample into a carrier that is a closed cavity that includes a base surface; and allowing the cells to settle on the base surface of the carrier to form a monolayer of cells on the base surface of the carrier.

7. The method according to claim 5, wherein allowing the blood sample to form the monolayer comprises allowing at least 80% of the cells to have direct contact with the base surface of the carrier.

8. Apparatus for use with a blood sample that includes a plurality of cells, the apparatus comprising:

a microscope, configured to acquire a series of images associated with a series of depth levels of the blood sample, by performing a depth scan of the red blood cells in the blood sample, under a brightfield illumination condition; and a computer processor comprising an autofocus computation module configured to:

receive the series of images, acquired under the brightfield illumination condition, from the microscope;

identify image contrast for the images acquired at at least some of the depth levels;

identify one of the depth levels as being an optimum focal plane for imaging the red blood cells within the blood sample using the microscope, under the brightfield illumination condition, by identifying that a drop in image contrast occurs at the identified depth level relative to the image contrast of images acquired at depth levels within a given range of distances from the identified depth level; and command the microscope to acquire an investigative image of the blood sample under a fluorescent illumination condition, by focusing the microscope at an investigative depth level that is based on the identified depth level.

9. The apparatus according to claim 8, wherein the computer processor is configured to command the microscope to acquire the investigative image of the blood sample under the fluorescent illumination condition, by focusing shifting a focus plane of the microscope from the identified depth level by a predetermined value.

10. The apparatus according to claim 8, wherein the computer processor is configured to identify one of the depth levels as the optimum focal plane by identifying that the identified depth level is such that image contrast at the identified depth level is lower than image contrast associated with a depth level immediately preceding the identified depth level in the series of depth levels and lower than image contrast associated with a depth level immediately following the identified depth level in the series of depth levels.

11. The apparatus according to claim 8, wherein the computer processor is configured to identify that a drop in image contrast occurs at the identified depth level by calculating image contrast using a contrast function selected from the group consisting of: variance, standard deviation, and sum of absolute-value of derivatives.

12. The apparatus according to claim 1, wherein the microscope is configured to image the blood sample after the blood sample has formed a monolayer of cells.

13. The apparatus according to claim 12, further comprising a carrier that is a closed cavity that includes a base surface, the carrier being configured to allow the cells to settle on the base surface of the carrier to form a monolayer of cells on the base surface of the carrier.

14. The apparatus according to claim 12, wherein the carrier is configured to allow at least 80% of the cells to have direct contact with the base surface of the carrier.

* * * * *